Patented Nov. 7, 1944

2,362,375

UNITED STATES PATENT OFFICE 2,362,375

DYEING VINYL POLYMERS

Karl Heymann, Meadville, Pa., assignor to American Viscose Corporation, Wilmington, Del., a corporation of Delaware No Drawing. Application February 15, 1940, Serial No. 319,019

16 Claims. (Cl. 8—55)

This invention relates to improvements in methods of dyeing yarns and other shapes comprising materials that are not readily permeable to water. More particularly, the invention relates to improvements in methods of dyeing yarns and other shapes comprising vinyl polymers, such as polymers of vinyl chloride and copolymers of vinyl acetate and vinyl chloride.

This applications is a continuation in part of my application Serial Number 311,109, filed December 27, 1939.

Materials that are not readily permeable to water can not be satisfactorily dyed by the ordinary dyeing procedure used in dyeing cotton, wool, natural silk and regenerated cellulose. When ordinary methods of dyeing are attempted the dye either does not penetrate the material and no dyeing is effected or when dyeing is effected the color is not fast and leaches out.

Yarns and other shapes of cellulose acetate which are not readily permeable to water have been dyed when treated with a liquid swelling agent, such as alcohol, acetone or acetic acid. The swelling agent forms or opens pores in the material into which the dye penetrates. There are certain objections to the use of liquid swelling agents. Generally a large amount of swelling agent is required. Also the swelling agent has a tendency to weaken the yarn or shape.

I have discovered that yarns and other shapes comprising vinyl polymers, such as polymers of vinyl chloride and copolymers of vinyl acetate and vinyl chloride can be successfully dyed with suspension dyestuffs when the dyeing operation is carried out in the presence of suspensions of certain normally solid organic compounds which have a solubility in polymers of vinyl chloride and copolymers of vinyl acetate and vinyl chloride of 2% or greater under the conditions at which the dyeing is carried out. By the term suspension dyestuffs is meant dyestuffs of the type applicable to cellulose acetate from a dispersion (insoluble anthraquinone and azo dyes) sometimes referred to as dispersol dyes, and the dyestuffs referred to hereinafter in the examples by their trade names, are of this type. The compounds which are referred to as assistants include:

Diphenyl
Naphthalene
Phenanthrene
α-Naphthol
β-Naphthol
Thio-β-naphthol
2.4-dichloro-α-naphthol
2.4-dibromo-α-naphthol
o-Hydroxydiphenyl
2-chloro-o-phenylphenol
4-chloro-o-phenylphenol
o-Cyclohexylphenol
2.4-dichloroaniline
2.5-dichloroaniline
α-Naphthylamine
β-Naphthylamine
Phenyl-α-naphthylamine
Phenyl-β-naphthylamine
o-Aminodiphenyl
p-Aminodiphenyl
p-Chlorobenzaldehyde
Resorcylaldehydedimethylether
p-Dimethylaminobenzaldehyde
o-Hydroxyacetophenone
Benzophenone
p-Hydroxybenzophenone
Methyl-β-naphthylketone
Camphor
8-hydroxyquinoline
Benzylsuccinate
Methyl-p-bromobenzoate
Phenylphthalate
β-Naphthylacetate
Benzhydrol
Phenylbenzylcarbinol
Fluorenyl alcohol
β,β'-Diphenoxydiethylether
p-Methoxydiphenyl
Benzyl-α-naphthylether In carrying out my improved method of dyeing a suspension of a single assistant or several assistants together may be used. The assistant is, for example, dissolved in a suitable solvent, such as alcohol, and the assistant in solution and a suitable dispersing agent, such as that known in the trade as Igepon T, are added to the dye bath. The dye bath contains a suspension dyestuff. The assistant is precipitated in the dye bath in colloidal or very finely divided form. When amino compounds are used as assistants they may be dissolved in an acid solution and precipitated and dispersed in an alkaline dye bath. Phenols may be dissolved in an alkaline solution and precipitated and dispersed in an acid dye bath. Satisfactory results are also obtained under certain conditions when the phenol solution is added to the dye bath and is not dispersed. The yarn or shape to be dyed is treated with the dye bath containing the assistant in the ordinary manner. This procedure may be followed using various quantities of dyestuff and assistants with different dye bath ratios and temperatures of the dye baths depending upon the character of the material being dyed and the type of dyeing that is being carried out. A satisfactory procedure is one in which the dye bath ratio is 1:30 and contains 1.5% suspension dyestuff with 5% or less of assistant based on the weight of the yarn or shape to be dyed. A suitable dye bath temperature is about 50° C. and the duration of the dyeing operation one hour. Other temperatures may also be used.

My invention may also be carried out by applying the assistant from suspension directly to the yarn or shape. When the yarn or shape is thereafter immersed in the dye bath the assistant aids the action of the dye bath on the yarn or shape in the same manner as when it has been added to the dye bath.

Instead of using either of the above methods, I may add the assistant directly to the vinyl polymers before the yarn or shape is formed. The yarn or shape containing the assistant is treated with the dye bath in the ordinary manner.

The following examples are illustrative of the invention:

*Example 1.*—Yarns comprising copolymers of vinyl acetate and vinyl chloride were dyed in dye baths having a dye bath ratio of 1:30 and containing 1.5% suspension dyestuff and 5% β-naphthol based on the weight of the yarn. The temperatures of the dye baths were 60° C. and the duration of the dyeing operation one hour. The dyestuffs that were used were Cibacete Orange 2R
   Cibacete Scarlet G
   Acele Violet B
   Acele Yellow 3G A dye bath was also used with Cibacete Scarlet G 1% and Acele Violet B 1% as the dyestuff.

*Example 2.*—Yarns comprising copolymers of vinyl acetate and vinyl chloride were dyed in dye baths having a dye bath ratio of 1:30 and containing 1.5% suspension dyestuff and 5% p-dimethylamino-benzaldehyde based in the weight of the yarn. The temperatures of the dye baths were 60° C. and the duration of the dyeing operation one hour. The dyestuffs there were used were Celliton Red Violet RR
   Phenacyl Navy Blue PV
   Phenacyl Red R
   Celutate Brill. Blue B
   Cibacete Rubine BS
   Artisil Direct Yellow 3GP

*Example 3.*—Yarns comprising copolymers of vinyl acetate and vinyl chloride were dyed in dye baths having a dye bath ratio of 1:30 and containing 1.5% suspension dyestuff and 1.5% Benzophenone based on the weight of the yarn. The temperatures of the dye baths were 60° C. and the duration of the dyeing operation one hour. The dyestuffs that were used were Celliton Fast Pink BA
   Acele Scarlet G
   Calconese Orange 3RC
   Cibacete Violet B
   Celutate Fast Blue GL
   Artisil Direct Yellow 3G ex.
   Phenacyl Red R

*Example 4.*—Yarns comprising copolymers of vinyl acetate and vinyl choride were dyed in dye baths having a dye bath ratio of 1:30 and containing 1.5% suspension dyestuff and 5% o-hydroxydiphenyl based on the weight of the yarn. The temperatures of the dye baths were 60° C. and the duration of the dyeing operation one hour. The dyestuffs that were used were Celliton Pink RF
   Celliton Red BP
   Celliton Orange 3RN
   Cibacete Yellow 2RN
   Celliton Fast Yellow GRA
   Cibacete Yellow 5G
   Cibacete Brill. Blue BGG
   Celliton Fast Blue FFRS
   Celliton Discharge Violet B
   Cibacete Discharge Violet 5R
   Camacyl Brill. Green B
   Phenacyl Red R
   Cibacete Violet B
   Artisil Direct Yellow 3 GP ex. conc.
   Celliton Fast Brown 5RA

*Example 5.*—Yarns comprising copolymers of vinyl acetate and vinyl chloride were treated with a bath in a ratio of 1:30 containing 5% o-hydroxydiphenyl based on the weight of the yarn at a temperature of 60° C. and for a period of one-half hour. The yarns so treated were then dyed by immersing in dye baths having a dye bath ratio of 1:30 and containing 1.5% suspension dyestuff based on the weight of the yarn. The temperatures of the dye baths were 60° C. and the duration of the dyeing operation one hour. The dyestuffs that were used were Camacyl Brill. Green B
   Phenacyl Red R
   Cibacete Violet B
   Artisil Direct Yellow 3GP ex. conc.
   Celliton Fast Brown 5RA While preferred assistants and procedures have been shown it is to be understood that changes and variations may be made without departing from the spirit and scope of the invention as defined in the appended claims.

What I claim is:

1. A method of dyeing yarns and other shapes comprising vinyl polymers, comprising the step of treating the yarn or shape with an aqueous dye bath containing a suspension dyestuff, in the presence of an organic compound selected from the group consisting of 2.4-dichloroaniline, 2.5-dichloroaniline, α-naphthylamine, β-naphthylamine, phenyl-α-naphthylamine, phenyl-β-naphthylamine, o-aminodiphenyl and p-aminodiphenyl.

2. A method of dyeing yarns and other shapes comprising copolymers of vinyl acetate and vinyl chloride, comprising the step of treating the yarn or shape with an aqueous dye bath containing a suspension dyestuff, in the presence of an organic compound selected from the group consisting of 2.4-dichloroaniline, 2.5-dichloroaniline, α-naphthylamine, β-naphthylamine, phenyl-α-naphthylamine, phenyl-β-naphthylamine, o-aminodiphenyl and p-aminodiphenyl.

3. A method of dyeing yarns and other shapes comprising vinyl polymers, comprising the step of treating the yarn or shape with an aqueous dye bath containing a suspension dyestuff and an organic compound selected from the group consisting of 2.4-dichloroaniline, 2.5-dichloroaniline, α-naphthylamine, β-naphthylamine, phenyl-α-naphthylamine, phenyl-β-naphthylamine, o-aminodiphenyl and p-aminodiphenyl disposed in the dye bath.

4. A method of dyeing yarns and other shapes comprising copolymers of vinyl acetate and vinyl chloride, comprising the step of treating the yarn or shape with an aqueous dye bath containing a suspension dyestuff and an organic compound selected from the group consisting of 2.4-dichloroaniline, 2.5-dichloroaniline, α-naphthylamine, β-naphthylamine, phenyl-α-naphthylamine, phenyl-β-naphthylamine, o-aminodiphenyl and p-aminodiphenyl dispersed in the dye bath.

5. A method of dyeing yarns and other shapes comprising vinyl polymers, comprising the step of treating the yarn or shape with an aqueous dye bath containing a suspension dyestuff in the presence of 2.5-dichloroaniline.

6. A method of dyeing yarns and other shapes comprising vinyl polymers, comprising the step of treating the yarn or shape with an aqueous dye bath containing a suspension dyestuff in the presence of p-aminodiphenyl.

7. A method of dyeing yarns and other shapes comprising vinyl polymers, comprising the step of treating the yarn or shape with an aqueous dye bath containing a suspension dyestuff in the presence of phenyl-α-naphthylamine.

8. A method of dyeing yarns and other shapes comprising copolymers of vinyl acetate and vinyl chloride, comprising the step of treating the yarn or shape with an aqueous dye bath containing a suspension dyestuff in the presence of 2.5-dichloroaniline.

9. A method of dyeing yarns and other shapes comprising copolymers of vinyl acetate and vinyl chloride, comprising the step of treating the yarn or shape with an aqueous dye bath containing a suspension dyestuff in the presence of p-aminodiphenyl.

10. A method of dyeing yarns and other shapes comprising copolymers of vinyl acetate and vinyl chloride, comprising the step of treating the yarn or shape with an aqueous dye bath containing a suspension dyestuff in the presence of phenyl-α-naphthylamine.

11. A method of dyeing yarns and other shapes comprising vinyl polymers, comprising the step of treating the yarn or shape with an aqueous dye bath containing a suspension dyestuff and 2.5-dichloroaniline dispersed in the dye bath.

12. A method of dyeing yarns and other shapes comprising vinyl polymers, comprising the step of treating the yarn or shape with an aqueous dye bath containing a suspension dyestuff and p-aminodiphenyl dispersed in the dye bath.

13. A method of dyeing yarns and other shapes comprising vinyl polymers, comprising the step of treating the yarn or shape with an aqueous dye bath containing a suspension dyestuff and phenyl-α-naphthylamine dispersed in the dye bath.

14. A method of dyeing yarns and other shapes comprising copolymers of vinyl acetate and vinyl chloride, comprising the step of treating the yarn or shape with an aqueous dye bath containing a suspension dyestuff and 2.5-dichloroaniline dispersed in the dye bath.

15. A method of dyeing yarns and other shapes comprising copolymers of vinyl acetate and vinyl chloride, comprising the step of treating the yarn or shape with an aqueous dye bath containing a suspension dyestuff and p-aminodiphenyl dispersed in the dye bath.

16. A method of dyeing yarns and other shapes comprising copolymers of vinyl acetate and vinyl chloride, comprising the step of treating the yarn or shape with an aqueous dye bath containing a suspension dyestuff and phenyl-α-naphthylamine dispersed in the dye bath.

KARL HEYMANN.